Oct. 8, 1963 J. T. KUTNEY 3,106,372
REINGESTION CONTROL MEANS
Filed April 15, 1960 2 Sheets-Sheet 1
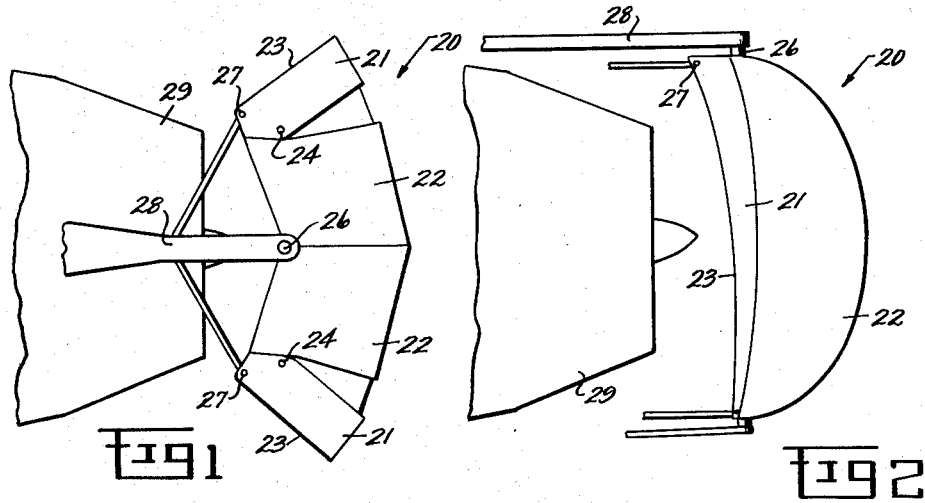
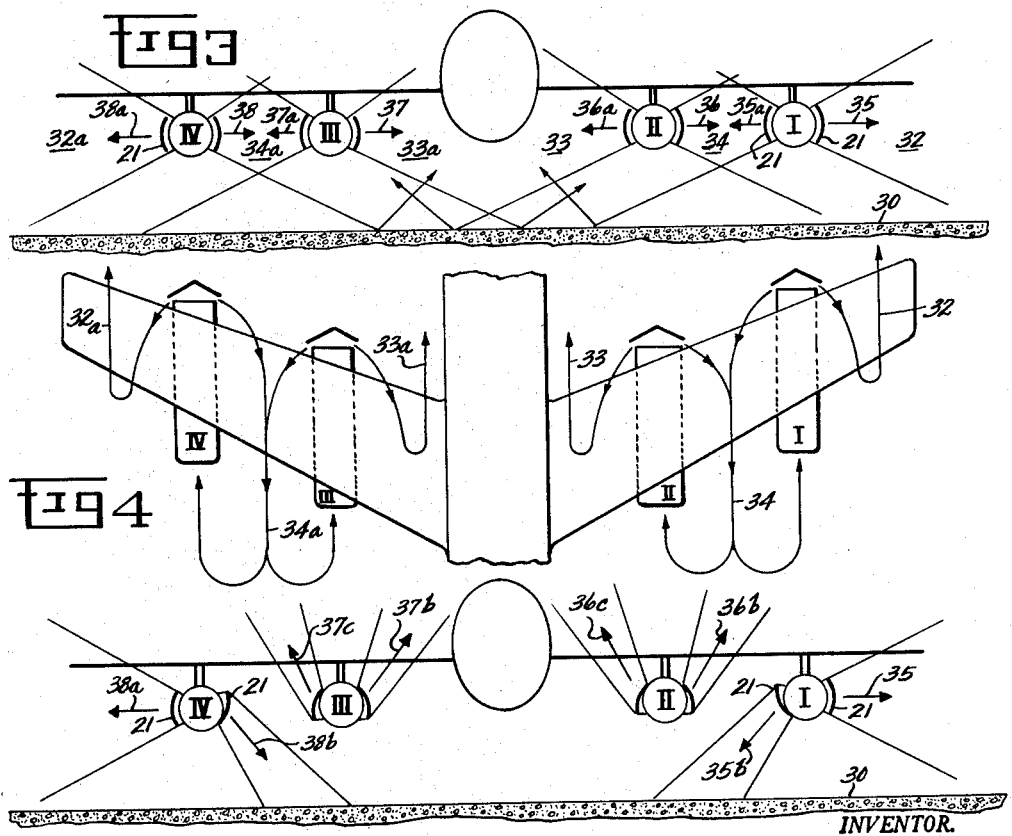
INVENTOR.
JOHN T. KUTNEY
BY Lee Hacho
ATTORNEY—

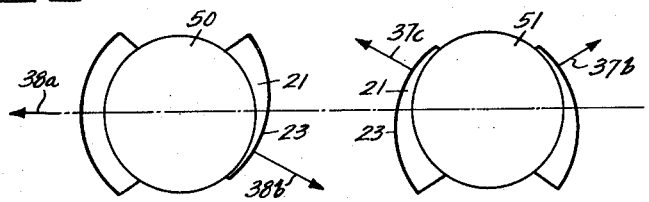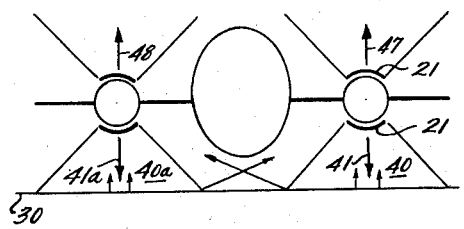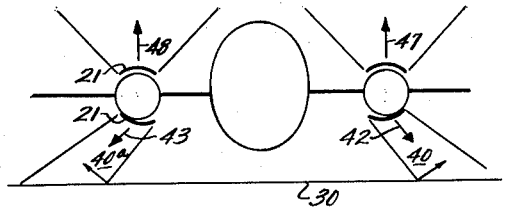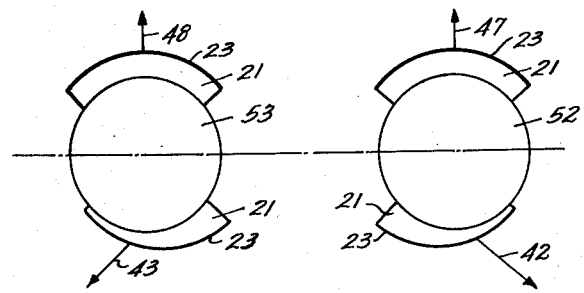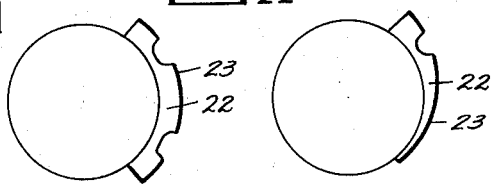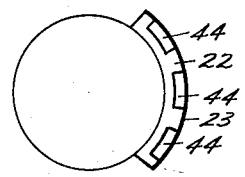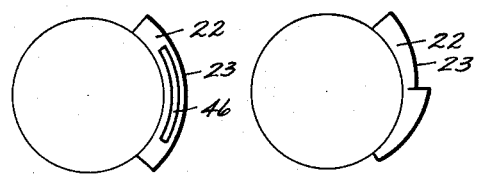

United States Patent Office 3,106,372
Patented Oct. 8, 1963

3,106,372
REINGESTION CONTROL MEANS
John T. Kutney, Silverton, Ohio, assignor to General Electric Company, a corporation of New York
Filed Apr. 15, 1960, Ser. No. 22,534
3 Claims. (Cl. 244—113)

This invention relates to a fluid flow direction control and, more particularly, to means for controlling fluid discharge from reaction engine thrust reversers.

Means to reduce the speed of apparatus such as an aircraft propelled by one or more reaction engines include redirecting a component of the thrust in the direction the apparatus is being propelled. One arrangement, sometimes referred to as a "target type thrust reverser" introduces a substantially solid baffle or target into the path of the rearwardly directed exhaust stream of a reaction engine thereby redirecting forward a portion of that exhaust. A component of thrust is thus directed forward and tends to slow the velocity of the apparatus.

The use of thrust reversers, particularly of the target type, has introduced problems and harmful effects which tend to conflict with the beneficial results obtainable from thrust reverser usage and to prevent its use to full effectiveness. One objectionable effect is produced by the proximity or contact of the redirected exhaust stream with a barrier such as with the propelled apparatus structure or with a surface on which the apparatus is landing. Another objectionable effect results from coalescence and interaction of the redirected exhaust streams of several engines, particularly when they are adjacent each other. This, in effect, constitutes contact with or interference by a fluid barrier.

Forwardly redirected hot exhaust "bouncing" forward from air field runways or surfaces of the aircraft, or after joining with or "bouncing from" other forwardly redirected streams, can reingest or re-enter the inlet of the same engine or other engines in the aircraft. Such reingestion tends to increase engine temperature; excessive reingestion can increase engine temperature above its safe operating limits. In addition, the redirected exhaust, in impinging on aerodynamic surfaces of an aircraft, can damage such surfaces or cause severe instability of the aircraft during reverser use, as in landing. It is desirable, nevertheless, to use such thrust reversers to as low a velocity as possible.

A principal object of this invention is to provide a means for controlling the redirected engine exhaust during thrust reverser operation to obviate the above mentioned difficulties and to allow a thrust reverser to be used with its full effectiveness.

Another object is to prevent reingestion of the reversed hot exhaust from a reaction engine into the inlet of that or other engines.

Still another object is to control reversed hot exhaust away from its aircraft surfaces, particularly aerodynamic control surfaces.

These and other objects and advantages will be better understood from the following more detailed description and from the drawings all of which are intended to be illustrative of rather than limitation on this invention.

In the drawings:

FIG. 1 is a partially fragmentary plan view of a target type thrust reverser in its operating or thrust reversing position;

FIG. 2 is a partially fragmentary side view of a target type thrust reverser in its operating or thrust reversing position;

FIGS. 3, 5, 7 and 8 are schematic views of multi-engine aircraft looking aft;

FIG. 4 is a schematic plan view of a multi-engine aircraft;

FIGS. 6 and 9–14 are embodiments of the exit control means included within the concept of the present invention.

It has been found that by uniquely defining and coordinating exit control means, such as exit shapes and design, of the discharge portion of a thrust reverser, reingestion and instability problems can be reduced to allow full use of thrust reverse means.

This invention broadly contemplates a thrust reverser of the target type for a reaction engine having a target portion and a number of discharge portions symmetrically arranged about the periphery of the target portion when the thrust reverser is in thrust reversing or operating position, each of the discharge portions having an exit control means which determines the exit direction of the center of mass flow of that portion of exhaust discharging from the thrust reverser. At least one of the exit control means directs the center of mass flow from its respective discharge portion along a line which, in relation to lines representing the direction of mass flow from its adjacent exit control means of that thrust reverser, defines an angle of other than 360° divided by the number of discharge portions.

In another form, this invention broadly contemplates a plurality of thrust reversers of the above described type for use in multi-reaction engine apparatus, in which juxtapositioned exit control means of the various thrust reversers direct flow discharge at an angle other than that which will cause the degree of interference with a neighboring solid or fluid barrier to bring about apparatus instability or damage or engine reingestion.

Target type thrust reversers can vary in design from a flat plate to a multiple segmented baffle including interacting flat or curved portions or fingers which together join in a compound or complex shape in redirecting the exhaust stream. However, for purposes of illustration herein, a two-part target type thrust reverser with or without movable discharge portions will be discussed.

In landing, thrust reversers must be capable of slowing down an aircraft within a given distance on a runway before wheel brakes can be used to complete the reduction of speed of the landing aircraft. Above a given velocity for each type of aircraft, reingestion does not ordinarily occur because the backward sweep of air will turn the reversed exhaust aft before damaging amounts can reach an engine inlet. However, there is a velocity for each aircraft below which the forward sweep of reversed exhaust, bouncing from the runway or from other such streams, is stronger than the backward sweep of air and reingestion can occur. It has been found that use of target type thrust reversers, particularly with some multi-engine aircraft, cannot reduce landing speed to a point practical for the application of wheel brakes without first stalling an engine due to hot exhaust reingestion.

Uncontrolled exhaust from a target type thrust reverser will cause damaging reingestion of the engines of some aircraft at relatively high forward flight speeds, for example 105 knots. Thus reingestion can reduce and even eliminate the usefulness of such thrust reversers. Furthermore, such uncontrolled reversed exhaust flowing forward over aircraft control surfaces can produce serious instability to the aircraft.

Although a number of varieties of target type thrust reversers are known in the art, each individual thrust reverser design discharges its reversed fluid mass in a manner which balances the forces acting forward. Thus a two-segment thrust reverser of the target type, as shown herein, will direct the center of gravity of the reversed flow mass in two portions each being 180° from the other. A three-segment target type thrust reverser, as shown in U.S. Patent 2,753,684—Greene, will direct reversed flow in three equal portions, the center of mass flow of each of which lies along a line 120° from that of its adjacent segment. Thus an uncontrolled target type thrust reverser of well known design and having "$n$" segments will direct its mass flow generally in equal parts. The parts have mass flow centers of gravity along symmetrically disposed lines at angles of 360°/"$n$." Thus the angle which is referred to herein as the "flow exit angle" is defined as the angle between lines along the centers of mass flow discharge of adjacent discharge portions of a target type thrust reverser, with these center lines projected on a plane transverse to the longitudinal axis of the engine with which the reverser is associated. According to this invention, by changing one or more flow exit angles of a target type thrust reverser to an angle other than 360° divided by the number of discharge portions, many of the problems associated with target type thrust reversers can simply and unexpectedly be reduced in significance.

Typical examples of the exit control means of this invention are illustrated schematically in FIGS. 6 and 9–14. However, one relatively simple but very useful embodiment is represented in FIGS. 1 and 2 as tapered edge 23 on movable discharge portions 21. That embodiment is sometimes referred to as the full taper design.

FIGS. 1 and 2 illustrate a two-part target type thrust reverser in thrust reversing position and having movable discharge portions, sometimes referred to as flaps, lips or end plates. The reverser, shown generally at 20, includes a target portion in the form of two blocker doors 22 each having a movable flap 21 hinged at its edge by pins 24. The blocker doors 22 are hinged together by pin 26 on the vertical center line of the engine frame 29 on which the thrust reverser is mounted. Actuation of the doors and their movable discharge portion or flap 21 is accomplished by a synchronized pair of control actuator means 28 (only one shown) connected with the blocker doors and the discharge portion through pins 26 and 27. Tapered edge 23 acts as the exit control means to control discharge of fluid passing from discharge portion 21.

Although it is possible that engine reingestion and aircraft instability can occur through the use of a target type thrust reverser on a single engine aircraft, control of the reversed flow of a single reverser according to this invention is relatively simple because no interaction with other reversers occurs. However, avoiding such problems on multi-engine aircraft requires coordination and unique variation in design to inhibit blocking, coalescence or interaction between the various reversers. FIGS. 3–5 and 7–8 illustrate schematically multi-engine aircraft and their thrust reversers. In FIGS. 3–5, the thrust reversers are mounted to redirect flow substantially horizontally and forward whereas in FIGS. 7–8 the reversers direct the flow substantially vertically and forward. Control of the reversed exhaust as in FIG. 5 avoids the problems illustrated in FIGS. 3 and 4 by uniquely adjusting the flow exit angles as shown. Control of the reversed exhaust in FIG. 8 avoids the problem illustrated in FIG. 7 in a like manner.

Reingestion due to engine proximity to the surface on which the aircraft is landing can be explained by reference to FIGS. 3 and 7 in which two and four engine aircraft are illustrated schematically looking aft. During reverser usage, prior to this invention, a portion of the forwardly and horizontally directed hot gas masses 33 and 33a the center of gravity of which was directed along lines 36a and 37 from inboard engines II and III, FIG. 3, or forwardly and vertically directed hot gas masses 40 and 40a, the center of gravity of which was directed along lines 41 and 41a respectively from engines I and II, FIG. 7, were deflected or "bounced" from the landing surface or barrier 30.

When the velocity of such reversed exhaust gases exceeds that of the backward sweep of ambient air, such uncontrolled hot exhaust gases reingest or re-enter the inlet of one or more of the engines causing the engine to stall. Stall can result in failure of the aircraft to have power, through reverse thrust, to stop or can result in high stresses, excessively high temperatures and other damage to the engine and its parts.

Another situation in which reingestion can occur as aircraft velocity is reduced is illustrated in the schematic plan view of FIG. 4. Ambient air sweeping aft over the aircraft may be adequate to turn aft the outboard reversed exhaust masses 32 and 32a of outboard engines I and IV, and the inboard reversed exhaust masses 33 and 33a of inboard engines II and III. However, prior to this invention, the uncontrolled forward and horizontally directed outboard exhaust masses of engines II and III, flowing along their center of gravity represented by lines 36 and 37 were blocked or coalesced into masses 34 and 34a respectively with the uncontrolled forward and horizontally directed inboard exhaust masses of engines I and IV, flowing along their center of gravity represented by lines 35a and 38. These masses of reversed exhaust lose continuity and are blocked in the horizontal direction. Thus the only direction they can go is forward. Such coalesced and blocked masses move forward with a combined force to a distance greater than they would normally travel individually under the same conditions. When the force of ambient air produced by the moving aircraft finally pushes the exhaust mass aft, that mass is in front of the engine inlet and is forced into the inlet of at least the two farthest aft engines, such as I and IV, and possibly into the inlet of all engines in the multi-engine aircraft. Thus one or more of the engines are reingested with hot exhaust and may lose power and stall.

The controlled reversed exhaust illustrated in FIGS. 5 and 8 are examples of two ways in which the present invention can be used to avoid reingestion. The flow exit angle of the reversers illustrated in FIGS. 5 and 8 are adjusted to prevent coalescence and interaction of two or more reversed exhaust masses and to eliminate the deleterious effects caused by such reversed exhaust masses deflecting from the runway into the inlet of the engine. In FIG. 5, opposing mass flows along 35a and 36 are redirected as shown by arrows 35b and 36b. Similar opposing mass flows along lines 37a and 38 are redirected along lines 37c and 38b, thus avoiding contact or interference one with the other. In a similar manner, mass flow along line 37 is redirected, in FIG. 5, away from the runway 30 along line 37b and 36a is redirected along line 36c to avoid the lateral deflection illustrated in FIG. 3. In FIG. 8, the mass flow the center of which travels along lines 41 and 41a has been redirected outwardly, as shown by arrows 42 and 43, to avoid deflection one toward the other. Thus the aircraft in FIGS. 5 and 8 remain balanced during reversed thrust but the reingestion problems are avoided.

Through the use of the present invention, aircraft velocities at which reingestion occurs can be radically reduced. In one case, such reingestion point was reduced from about 105 knots to about 32 knots. In that case, 60 knots was a practical velocity at which wheel brakes could be applied. Loss of reverse thrust through use of this invention in that case was only about 5% over that obtainable from uncontrolled use of the same thrust reverser.

This invention has been found to be particularly useful with the two-part target type thrust reverser represented in FIGS. 1 and 2. FIGS. 6 and 9 are illustrations of exit control means in the form of a half taper or full taper which can be used on multi-engine aircraft. The coordinated control means of FIG. 6 is the same as is contemplated for use on the engine groupings III and IV of FIG. 5 to result in controlled reverse exhaust. In FIG. 6, the center of mass flow from target 50 passes over discharge portion 21 and over exit control means or edge portion 23 along line 38b. Similarly the flow from target 51 is redirected along 37b and 37c in order to avoid contact with 38b or, in the case of 37b, to avoid reingestion of an engine to the right of target 51.

A similar arrangement of the type used to redirect the flow shown in FIG. 8 is shown in FIG. 9 with the full taper design. The centers of mass flow from targets 52 and 53 pass along lines 42 and 43 respectively, first over discharge portion 21 and then over control means or edge portions 23.

It is to be noted in FIGS. 6 and 9 that the angles between the centers of mass flow 38a and 38b, 37b and 37c, 42 and 47, and 43 and 48 respectively are different than the 180° angle normally found in two-part target type thrust reversers.

Irregularly or complex shaped exit control means such as the edge portions shown in FIGS. 10 and 11 around their respective targets can be used to give any desired unique direction and control.

Although control of reversed exhaust can be achieved by unique reshaping of the exit portions, whether or not movable, of target type thrust reversers, it has been shown that other means can be used to direct or control the reversed exhaust in a way to avoid engine reingestion and aircraft instability. Examples of such means tested include use of one or more of the tabs 44, FIG. 12, inclusions of openings or slots 46 as illustrated in FIG. 13, or the use of spiral fins or split and twisted edges, as in FIG. 14, to vary the flow exit angle as defined herein.

Through the use of the present invention, thrust reversers of the target type can be used to their full intended effectiveness in a manner which avoids damage to surfaces of the aircraft, avoids aircraft instability and avoids reingestion of the engines.

Although this invention has been described in connection with specific examples, it will be understood by one skilled in this art, the modifications and variations of which this invention is capable.

What is claimed is:

1. A two-segment thrust reverser of the target type for a reaction engine comprising a target portion and two discharge portions disposed at the periphery of the target portion substantially opposite one another when the thrust reverser is in thrust reversing position, each of said discharge portions having an exit control means to define the exit direction of discharge flow, said exit control means directing the centers of mass flow from their respective discharge portions at a flow exit angle of other than 360° divided by the number "$n$" of said exit control means, where the flow exit angle is the angle between said centers of mass flow projected on a plane transverse to the longitudinal axis of said engine.

2. The thrust reverser as described in claim 1 wherein one of said exit control means is arranged to direct the center of mass of a portion of the discharge flow forward and horizontally outward and the other of said exit control means is arranged to direct the center of mass of another portion of the discharge flow forward and other than vertically downward.

3. A thrust reverser system for a vehicle propelled by at least one pair of reaction engines mounted to the vehicle with the engines of the pair disposed symmetrically with respect to the center line of the vehicle and with each engine having an exhaust outlet, a thrust reverser mounted to each of said engines adjacent to its exhaust outlet and including target means having a plurality of discharge portions symmetrically disposed about the periphery thereof when the target means is in thrust reversing position, each of said discharge portions having an exit control means to define the exit direction of discharge flow, the exit control means of the thrust reverser of one engine of said pair directing flow from its respective discharge portions asymmetrically with respect to the center line of the associated engine, and the exit control means of the thrust reverser of the other engine of said pair directing flow from its respective discharge portion with such complementary asymmetry with respect to its engine center line that the net reverse thrust produced by the engine pair is symmetrical with respect to the center line of the vehicle.

References Cited in the file of this patent

UNITED STATES PATENTS

| | | |
|---|---|---|
| 2,839,891 | Drakeley | June 24, 1958 |
| 2,866,610 | Taylor | Dec. 30, 1958 |
| 2,955,417 | Brown | Oct. 11, 1960 |
| 3,002,343 | Baird | Oct. 3, 1961 |